April 2, 1963      H. E. McKITRICK      3,083,608
PIPE ORGAN SERVICING APPARATUS Filed May 17, 1960      7 Sheets-Sheet 1

INVENTOR.
Herbert E. McKitrick
BY
Nobbe & Swope
ATTORNEYS

April 2, 1963  H. E. McKITRICK  3,083,608
PIPE ORGAN SERVICING APPARATUS
Filed May 17, 1960                                  7 Sheets-Sheet 2

INVENTOR.
Herbert E. McKitrick
BY
Nobbe & Swope
ATTORNEYS

INVENTOR.
Herbert E. McKitrick
BY
Hobbs & Swope
ATTORNEYS

April 2, 1963    H. E. McKITRICK    3,083,608
PIPE ORGAN SERVICING APPARATUS
Filed May 17, 1960    7 Sheets-Sheet 6

INVENTOR.
Herbert E. McKitrick
BY
Nobbe & Swope
ATTORNEYS 3,083,608
PIPE ORGAN SERVICING APPARATUS
Herbert E. McKitrick, Box 477, Rte. 4, Swanton, Ohio
Filed May 17, 1960, Ser. No. 29,765
6 Claims. (Cl. 84—456)

This invention relates broadly to the servicing of pipe organs and more particularly to an improved organ servicing apparatus by means of which the sounding elements of a pipe organ can be actuated while corrective tuning and servicing adjustments are being made.

One of the foremost difficulties encountered in the servicing of a pipe organ has been the impossibility for such work to be satisfactorily carried out in the actual area of the pipes and while the servicemen is at a distance from the organ console at which the circuits to the pipe actuating elements originate. Such a circumstance presents itself when, after using the keys of an organ manual, it is found that the functioning of one or more pipes is not satisfactory. Common sources of such malfunctioning become evident in the location of fluttering or unsteady tones; the finding of an unexpectedly "dead" pipe and failure of the "chest magnets," which cause sounding of the pipes, to operate for one reason or another. While the particular pipe or series of faulty pipes can be noted and then properly repaired in the loft area of the pipe organ, it is quite understandable that when such repair is being carried out, the servicer cannot repeatedly return to the organ console to occasionally cause sounding of the pipe until the correction has been made. Likewise, in the tuning of the pipe organ, the servicer is not able to simultaneously adjust the tone of a pipe while causing the sounding of the desired tone to be made.

One obvious expedient to such situations is to do such servicing work with an assistant who remains at the organ console and plays the manual keys as instructed by the distant servicer. However, I have found that such additional help is not always available; the relaying of required instructions is not always convenient and at times they are not thoroughly understood and that such assistance cannot entirely be depended upon when emergencies arise. One endeavor made in the past to eliminate the use of an assistant has been to provide auxiliary equipment which is temporarily mounted on the organ console and includes striking members equaling in number the keys of the manual and adapted to depress each of the same according to the selection of the serviceman. Such equipment is in actual practice found to be cumbersome in handling and its use restricted to one size of organ or to the predetermined number of keys in an organ manual for which the equipment is constructed. This last feature particularly limits the range of service work since it is not possible to readily accommodate one form of such equipment to a variety of pipe organs having greater playing ranges. Other proposed devices employ sound members which produce tones against which the tones of the organ notes are compared; however, it is quite apparent that to insure satisfactory operation, the sounding members must themselves be constantly checked to prevent loss of the desired tone quality. To reduce, if not completely eliminate such circumstances, it is herein proposed to provide a servicing apparatus, such as will hereinafter be more fully described, that will enable an organ servicer to find the sources of trouble in a usual manner; to then repair the same and, while working individually, directly create the necessary sounding of the organ pipes until the work is completed. More than this, such servicing apparatus is adapted to be readily and quickly connected to a pipe organ whereby little or no delay interrupts the actual repair work.

The principal object of the invention, therefore, resides in the provision of an improved organ servicing apparatus whereby the entire playing range of the pipes of any pipe organ can be sounded at a distance from the ordinarily operated key manuals thereof.

Another object of the invention is to provide an improved servicing apparatus of the above character that is portable and readily attached to a pipe organ or an organ unit thereof at permanently established connections.

Another object of the invention is to provide an organ servicing apparatus of the above character in which the playing of any pipe or group of chromatically related pipes is done in prearranged order thereby reducing inaccurate contrasting of organ tone.

Another object of the invention is to provide an organ servicing apparatus in which controls are provided to accurately sound the pipes of an organ in ascending or descending sequences of tone.

A further object of the invention is to provide an organ servicing apparatus having means for simultaneously sounding the selected pipes of one or more units of a pipe organ in prearranged selections of tonal contrast.

A further object of the invention is to provide in an organ servicing apparatus, means for increasing the range of servicing operation where the playing ranges of pipe organs vary.

A still further object of the invention is to provide an improved servicing apparatus for pipe organs that includes a portable, relatively lightweight case; having controls that are compactly arranged in said case and which is durably constructed to operate over a long period of use.

Other objects, and advantages of the invention will become more apparent during the course of the following description when read in connection with the accompanying drawings.

In the drawings, wherein like numerals are employed to designate like parts throughout the same:

Figure 3:
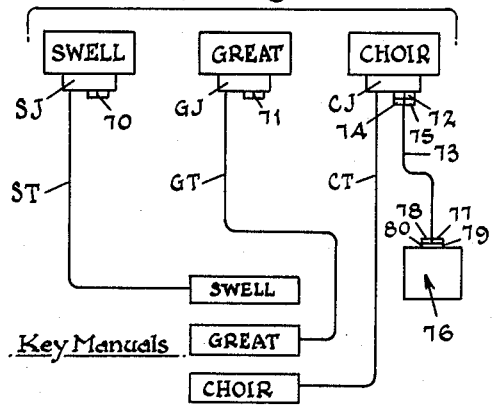
FIG. 3 is a diagrammatic view of the servicing apparatus connected to one unit of a pipe organ.

Referring now to the drawings and initially to FIG. 3, there is diagrammatically illustrated an electric or pneumatic-electric pipe organ with which the servicing apparatus of my invention may be advantageously employed. By way of example, such a pipe organ may comprise three organ units, designated "Swell," "Great" and "Choir," although it is to be understood that use of the servicing apparatus is equally applicable to pipe organs that include additional organ units such as the "Solo" and the "Echo." However, in considering the playing of a three unit pipe organ, the console therefor is provided with key manuals, as indicated, which are connected by electric circuits to their respective organ units through trunk cables, designated by the letters ST, GT and CT respectively. These cables, or the circuits therein, are connected to the actuating elements for the sounding pipes of each organ unit at junction boxes designated SJ, GJ and CJ respectively. Since an important feature of the invention lies in the simplicity and rapidity with which a servicing operation can be started, I provide at each of these junction boxes a permanently installed multiple terminal block, individually designated by the numerals 70, 71 and 72, and equipped with wire connections to each line circuit from the junction box to the actuating element for each organ pipe. By way of a portable cable 73 having complementary terminal blocks 74 and 75 at one end thereof, the servicing apparatus, constructed in accordance with the invention and generally designated by the numeral 76, is connected to the terminal block of the organ unit to be inspected and/or tuned; the cable being connected to said apparatus at its opposite end by the insertion of terminal blocks 77 and 78 into blocks 79 and 80 associated with the apparatus.

I realize that the playing range of any particular pipe organ may vary and, in setting forth the features of the servicing apparatus, will describe use of the same in connection with a pipe organ wherein each of the manuals for the Swell, Great and Choir organ units includes a range of sixty-one keys; although, as will hereinafter be more fully described, manuals and organ units having a greater playing range or number of keys may generally be included. Specifically, the sixty-one keys characterize a multiplicity of notes beginning with a low "C" and ascending through several octaves to a high "C." Therefore, in the event that the sixty-one notes, or the pipes producing the tones of such notes, of the Choir organ unit are to be checked, the tuning or servicing apparatus 76 is connected as shown in FIG. 3 in such a manner as to be connected into the pipe circuits from the Choir manual through the cable CT, at the junction box CJ and thereby operatively replace the same by circuits originating in the service apparatus when the same is attached to the terminal block 72. Likewise, in individually servicing either the Swell or Great organ units, the apparatus 76 is connected to the terminal block therefor whereupon the normal operating organ circuits will temporarily not be required.

Generally stated, when the servicing apparatus 76 is connected to the junction box of any particular organ unit, it is not possible for each pipe to be sounded at random but only in preselected relation to one or more other pipes and in musical contrast thereto. For this purpose, an auxiliary sounding circuit to each pipe is connected one or more times to a plurality of control switches that are adapted to establish specified connections to each of the pipes whereby in progressive order they can be sounded in relation to one or more other pipes. When such sounding circuits have been predeterminedly established for one or more pipes, additional control switches are employed to complete the same to a power source and to enable the pipes to be sounded individually and in unison. In other words, when the sounding circuits for one or more predetermined pipes have been established, they will be automatically maintained in their relation while the control switches are individually employed to sound the pipe to be tuned or any of the pipes preselected to sound a contrast tone thereagainst. And, as aforementioned, by the use of a servicing and/or tuning apparatus of this invention, it is possible for an organ servicer to enter the loft area of the pipe organ and immediately proceed with his work after he has connected the servicing apparatus to the particular organ unit to be inspected.

Figure 1:
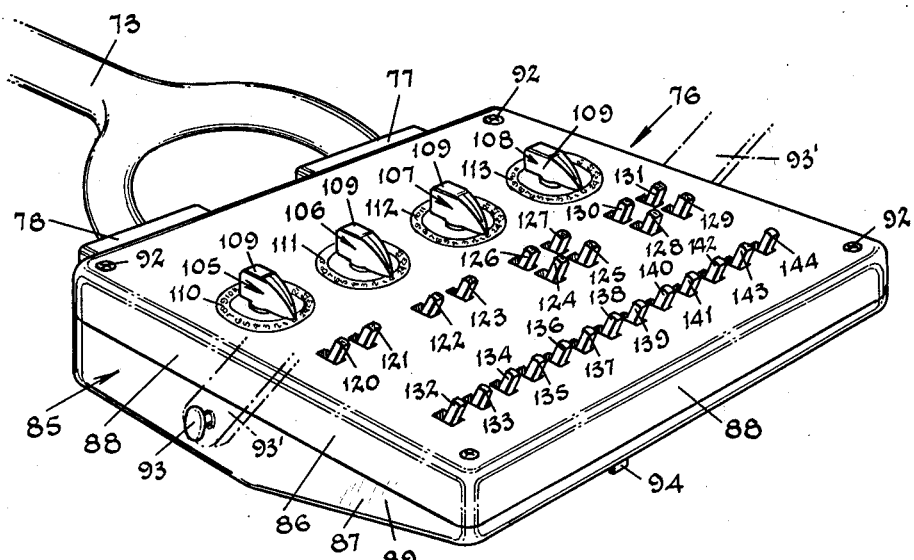
FIG. 1 is a perspective view of an organ servicing apparatus constructed in accordance with the invention.
Figure 2:
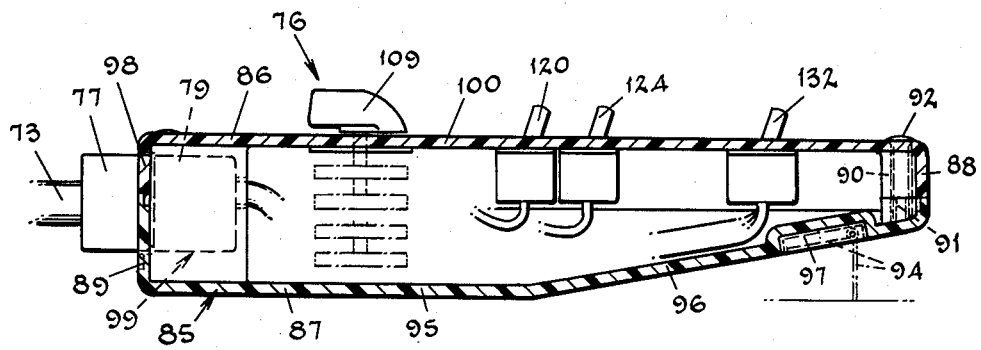
FIG. 2 is a transverse, vertical sectional view of the servicing apparatus.

The electric circuit lines carried by the cable 73 and entering the apparatus 76 from the junction box CJ by way of the terminal blocks 79 and 80 are selectively closed and opened in response to the operation of a plurality of switches provided in said apparatus and more specifically mounted in a portable case 85 therefor. As shown in FIGS. 1 and 2, the case 85 comprises an upper cover or mounting panel 86 and a bottom or closure panel 87. Briefly stated, the panels 86 and 87 may be, and as herein shown, are formed of a suitably moldable thermoplastic material and are each shaped so as to afford a lightweight case of compact appearance. To easily secure the panels in their respective positions, the walls 88 of the upper mounting panel 86 are formed at their respective corners with inner enlarged portions having screw receiving passages 90 while in the similar corners formed by the walls 89 of the bottom panel 87, enlarged portions contain internally threaded plugs 91 into which screws 92 are threaded when the case is assembled. In order to carry the case, the opposed side walls 89 are provided with integral studs 93 to which the ends of a sling 93', as shown in broken line in FIG. 1, can be attached in order that the apparatus can be bodily supported and easily carried by an organ servicer while his hands are free to do the necessary work. Otherwise, when the case 85 is to be placed on a fixed support such as the cabinet of an organ unit, a normally concealed pedestal or leg 94 is employed. Due to the arrangement of the switches within the case 85, the bottom wall 95 of the lower panel 87 is formed with an upwardly sloping portion 96 and the leg 94 is mounted therein by means of a container 97. Conventionally, the leg 94 is spring-biased into the container 97 and normally is received therein substantially flush with the surface of the case formed by the wall portion 96.

One or the rear wall portion 98 of the upper panel walls 88 is formed with recesses, as indicated at 99 in FIG. 2, in which the terminal blocks 79 and 80 are permanently installed. As well, the outer surface of the top wall 100 of the mounting panel 86 is suitably provided with openings through which the several knob shafts for the control switches are inserted as the switch devices are attached to the undersurface of the wall 100 so as to be contained within the case when the same is assembled. Thus, a plurality of so-called "gang" switches 105, 106, 107 and 108 are located in spaced and aligned relation to one another adjacent the rear end of the case 85 and are each equipped with a knob 109 having a pointer end adapted to register with the legends of associated dials 110, 111, 112 and 113.

Each of the gang switches 105, 106, 107 and 108, as will be more fully described, are adapted to initially establish sounding circuits which are connected into the existent organ circuits from the manually operated keys to the actuating elements for the organ pipes; hereinafter being referred to as "tuning" or pipe selector control switches.

In spaced relation on the top wall 100 to the pipe selector control switches are a plurality of control switches that are arranged to complete each of the electric sounding circuits to the organ unit to which the apparatus is connected and from any of the switches 105 to 108 inclusive. As will be more fully hereinafter disclosed, the circuit control switches 120 and 121 are associated with the selector control switch 105; switches 122 and 123 with the selector control switch 106; switches 124, 125, 126 and 127 with the control switch 107 and switches 128, 129, 130 and 131 with control switch 108. Additionally, a row of switches 132 to 144 inclusive are located between the circuit control switches 120–131 and the forward end of the case 85. The switches 132–144 are interposed in the lines of the sounding circuits, originating in the pipe selector control switch 105, between said switch 105 and the terminal blocks 79 and 80.

In order that explanation of the servicing apparatus can be easily simplified, the numerals 1 to 61 have been related to the respective sixty-one notes in a plurality of octaves in which the seven "full" notes are interspersed by the five "half" notes. As expressed in this invention, each note is identified in its ascending octaval spacing by the respective numbers, as in the following table:

```
C    1—13—25—37—49—61
C#   2—14—26—38—50
D    3—15—27—39—51
D#   4—16—28—40—52
E    5—17—29—41—53
F    6—18—30—42—54
F#   7—19—31—43—55
G    8—20—32—44—56
G#   9—21—33—45—57
A   10—22—34—46—58
A#  11—23—35—47—59
B   12—24—36—48—60
```

Figure 6:
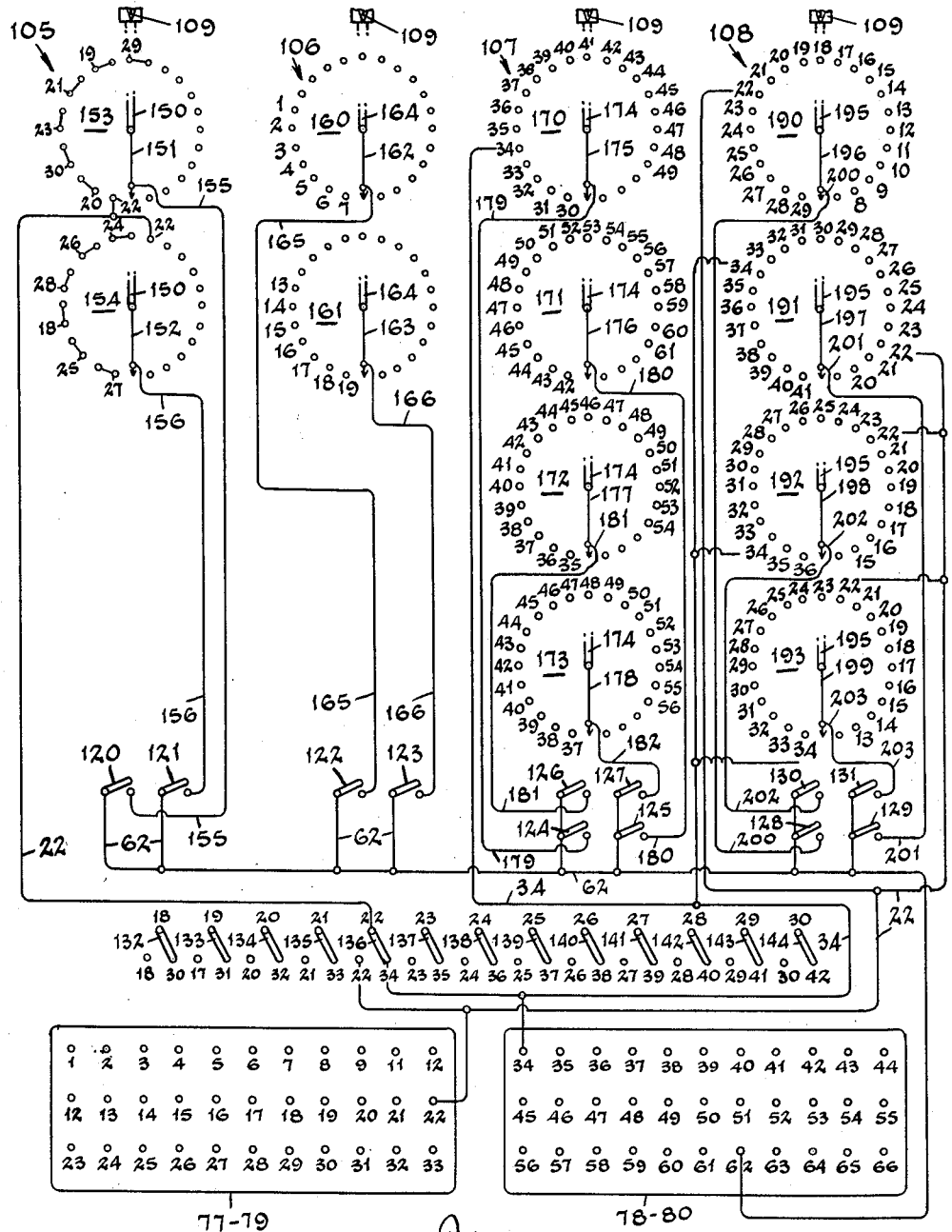
FIG. 6 is a composite diagrammatic view of the electric circuits of the organ servicing apparatus.

Reference to and use of the note numerals is thus found in the diagrammatic showing of the terminal block 77 of FIG. 6, in which numerals 1 to 33 will be understood to denote the related sounding circuit for the note of the designated numeral and connected through attaching blocks 77 and 79 and cable 73 to the respective organ circuits for the pipes of the organ unit to be inspected. Likewise, numerals 34 to 61 of block 78 are connected through blocks 78 and 80 and the cable to the organ circuits for the remaining pipes of the organ unit. As herein employed, numeral 62 designates one side of an electric circuit source while numerals 63, 64, 65 and 66 are "open." The circuit control switches 120 and 131 inclusive are therefore connected by lead 62 into one side of the electrical source circuit of the pipe organ to complete the circuit of any pipe actuating element, such as a "chest magnet" which is connected to the opposite side of the source circuit in the usual manner.

In accordance with the above explanation, the contacts of various tuning or selector control switches, while designated specifically by one of the above numerals of the table, will be understood to characterize the octave position of a particular note, the pipe for which will be accurately sounded upon closure of a respective circuit control switch.

I have found that, in some circumstances, in the sounding of a selected scale in the servicing and/or tuning of a pipe organ or unit thereof, it is advantageous to so arrange the control of one of the key control switches, such as the switch 105, that it will be adapted to cause the sounding of organ pipes, individually or in contrast to one another, through one octave. This selected octave is based on the initial tone of a 440 pitch A, and since a pipe organ is an instrument having sound vibrations of fixed frequency, the octave, originating with an A note, generally includes a scale having twelve intervals. Each interval has the same frequency between consecutive notes; therefore, as is well known, a scale of this character has been commonly established as a "tempered" scale. Stated otherwise, a tempered scale is a mathematically perfect scale in which the frequencies of vibration all have simple ratios to that of the fundamental note.

Accordingly, the selector control switch 105 (FIGS. 6 and 7) comprises a rotor shaft 150 carrying rotor contacts 151 and 152 and in addition has two series of fixed contacts 153 and 154. The rotor contact 151 is connected by lead 155 to one side of circuit control switch 120 while the rotor contact 152 is similarly connected to switch 121 by a lead 156. The first fixed contact of series 153 is identified as A–22 and by line 22 is connected to one side of shift switch 136. The circuits from this switch can be completed through line 22 to the outlet 22 of the terminal block 79; however, as herein shown, switch 136 is positioned to connect line 22 to line 34; this being desirable to sound the A–34 or the same note one octave higher.

In the following table, the relation of note numerals is arranged according to the stationary contacts of switch 105 and the circuits completed through the individual switches 132 to 144. It will be appreciated that the switches 132–144 are connected to consecutive notes of the scale and in ascending order from the F18 note.

| Dial position | Contact Series 153 | Contact Series 154 |
|---|---|---|
| 1 | A–22 switch 136 A–34 | D–27 switch 141 D–39. |
| 2 | G–20 switch 134 G–32 | D–27 switch 141 D–39. |
| 3 | G–20 switch 134 G–32 | C–25 switch 139 C–37. |
| 4 | F–30 switch 144 F–42 | C–25 switch 139 C–37. |
| 5 | F–30 switch 144 F–42 | F–18 switch 132 F–30. |
| 6 | A#23 switch 137 A#35 | F–18 switch 132 F–30. |
| 7 | A#23 switch 137 A#35 | D#28 switch 142 D#40. |
| 8 | G#21 switch 135 G#33 | D#28 switch 142 D#40. |
| 9 | G#21 switch 135 G#33 | C#26 switch 140 C#38. |
| 10 | F#19 switch 133 F#31 | C#26 switch 140 C#38. |
| 11 | F#19 switch 133 F#31 | B–24 switch 138 B–36. |
| 12 | E–29 switch 143 E–41 | B–24 switch 138 B–36. |
| 13 | E–29 switch 143 E–41 | A–22 switch 136 A–34. |

In other words, except for first or "odd" position of A–22 in contact series 153 and last "odd" position A–22 in contact series 154 which are interconnected, the succeeding contacts of each series are connected together in pairs and one lead is useable therefrom to the related shift switch.

Figure 7:
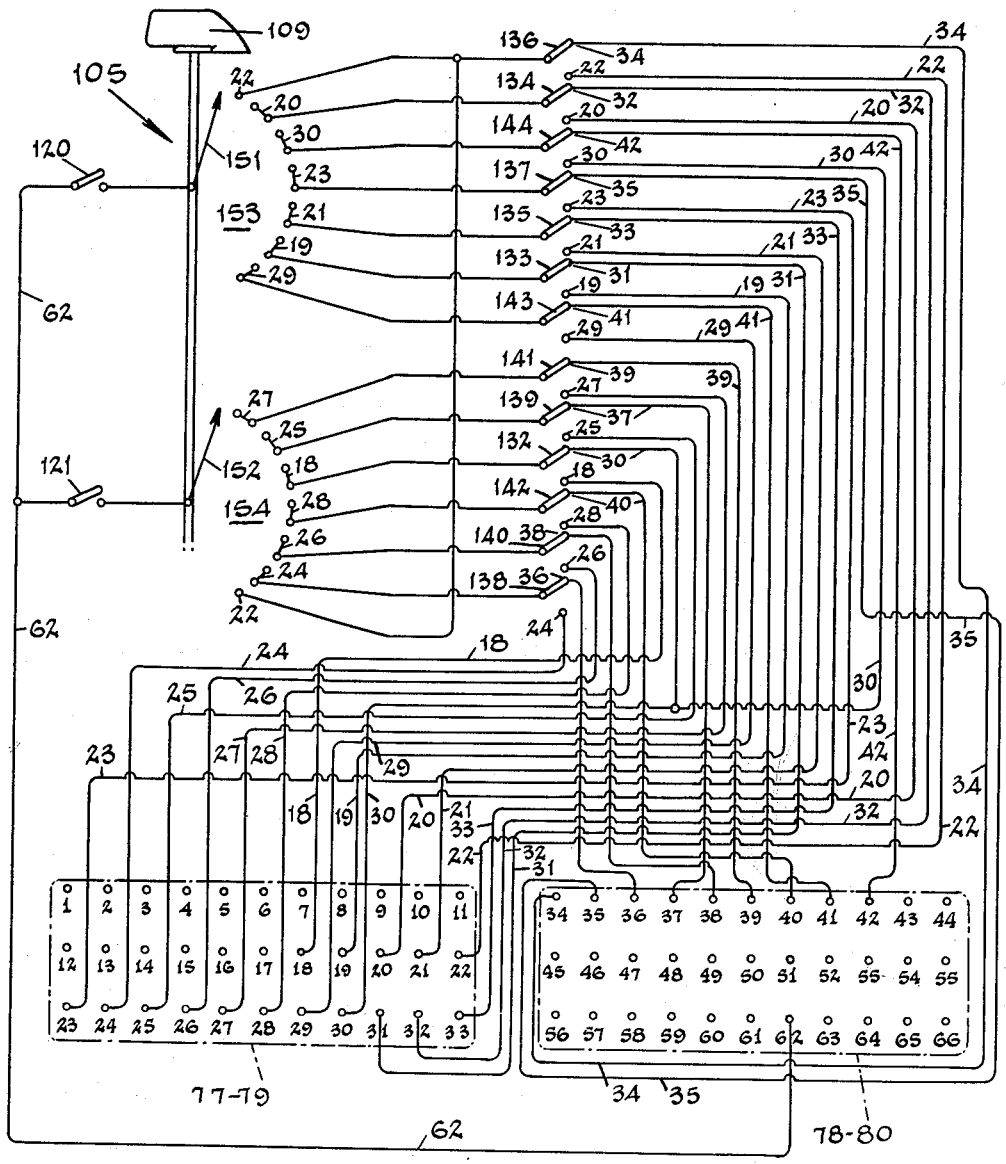
FIG. 7 is a diagrammatic view of the circuit of one pipe selector control switch.

The contacts of series 153 of the two-gang selector switch 105, thus designated by the respective "note" numerals, are connected to the consecutively numbered components at the fixed terminal of the above mentioned three-pole switches 132 to 144 inclusive, such that A–22 of 440 pitch at the first position is connected through switch 136 on one side thereof to connector 22 of the block 77 and therethrough to the respective organ circuit for the pipe of the organ unit being tuned, or, as herein shown, to initially sound the next higher octave to A–34 and connector 34 of terminal blocks 78 and 80. This situation is equally true of the remainder of the shift switches as shown in FIGS. 6 and 7 and to sound the notes of one octave in the above set forth relationship as from F–30 to F–42. On the other hand, upon shifting of the switches 132–144, which may be of the toggle or slide variety, to the other side thereof, the range of the sounding pipes will descend to the next succeeding lower octave as from F–18 to F–30. This of course can be obtained by individual manipulation of the several switches or by interconnecting the switches so as to shift the same in one common movement.

In any event, it is to be understood that with the rotary contacts 151 and 152 at the first position of the contact series 153 and 154 as indicated on dial 110, closure of circuit control switch 120 will complete a line from lead 62 through line 155 and line 22 from fixed contact 22 to sound the pipe of A–34—440 pitch through switch 136 and this can be initially tuned, if desired, in any suitable manner as by a tuning fork. Upon closure of switch 121, the sounding of a second contrasting note will be made upon completion of lines 62 and 156 and through line 27 to shift switch 141 whereby D–39 will complete to connector 39 of blocks 78 and 80 and thence to the organ circuit for the respective pipe of the organ unit through cable 73. Likewise, upon turning of shaft 150 to the second legend of dial 110, the contacts 151 and 152 will engage G–20 of contact series 153 to sound G–32 through switch 134 and D–27 (or D–39) of contact series 154 through the switch 141. Upon sequential closure of switches 120 and 121, the contrasting sounding of the organ pipes will be made between the initially sounded second note (D–27) and a third note (G–20). Progressive turning of the rotary contacts into engagement with the remainder of the fixed contact series will sound the associated pipes in varying contrasting tones until E–29 or, in this instance, E–41 is sounded with A–22 or A–34.

Having satisfactorily sounded a "well-tempered" scale, the pipe selector control switches 106, 107 and 108 are selectively employed to tune each of the above-described pipe notes, or any of the remaining notes within playing range of the organ manual, alone and either against the same note of the next higher or lower octave or in contrasting relation to preselected notes. This accurate choice for tuning the pipes of an organ unit is established in accordance with well-founded practices of organ servicers and to obtain the required chromatically correct tuning of the pipes. This procedure greately reduces the usually necessitated searching and completion of the respective sounding notes since in the sounding of tonal contrasts, a predetermined arrangement, as above described, has proved to be one of the most accurate expedients known to organ servicers. Therefore, instead of sounding any pipe at random or resorting to uncertain searching for the desired note and contrasting note combinations therefor, provision is herein made to progressively ascend or descend through a plurality of musical octaves through the use of the selector control switches 106, 107 and 108 that are initially wired to effect the sounding of each note and the prearranged sounding of contrasting notes.

Figure 8:
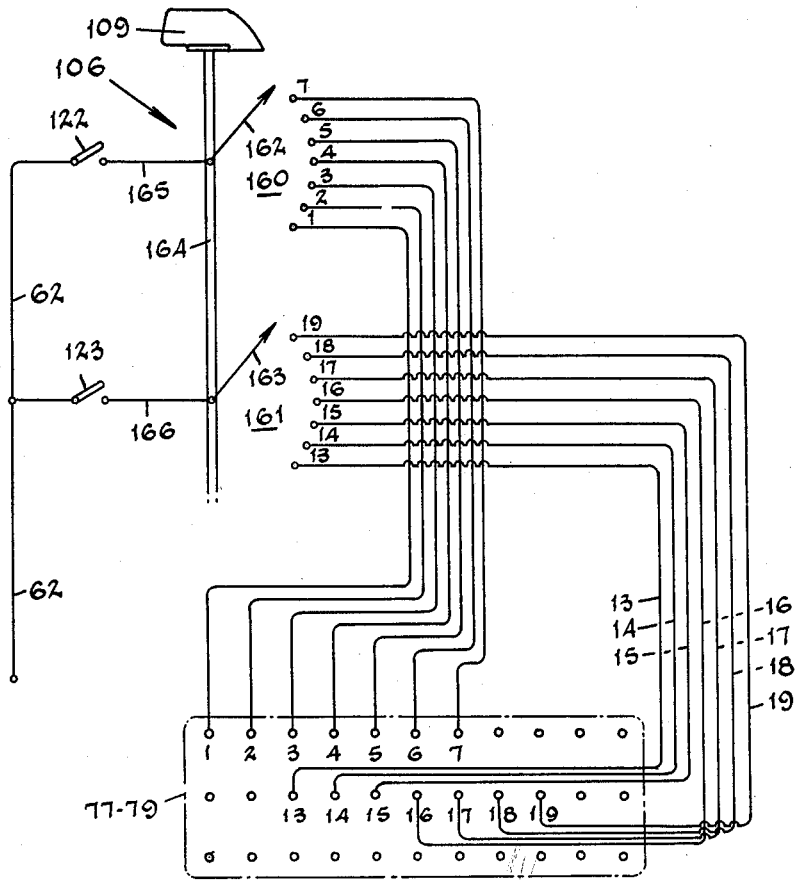
FIG. 8 is a diagrammatic view of the circuit of a second pipe selector control switch.

In considering use of the pipe selector control switches 106, 107 and 108, it will become apparent that the sounding of one selected organ pipe in any particular organ unit can be produced upon the engagement of contacts associated with selector switch 105 as well as contacts of switches 106, 107 or 108. Thus, the pipe of note A–34 will be sounded by switch 105 during closure of circuit control switch 120 when contact 151 is engaged with contact 22 of series 153 and shift switch 136 is connected by the 34 line to terminal blocks 78 and 80. And, as will hereinafter be more fully explained, the pipe related to A–34 will be selectively sounded one or more times during the use of selector control switches 107 and 108. Therefore, while the circuitry of each of the control switches 105, 106, 107 and 108 is generally shown in FIG. 6, more specific reference to the actual line connections is found in switch 105 of FIG. 7, switch 106 of FIG. 8, switch 107 of FIG. 9 and switch 108 of FIG. 10. Accordingly, the leads to any of the connections of terminal blocks 77—79 and 78—80 will be understood to complete the sounding circuit to the related organ circuit and thereby sound the pipe of a particular note during the individual use of the selector control switches as will be explained hereinafter.

Primarily, the pipe selector control switch 106 is a two-gang device which will produce the sounding of the pipes associated with the first seven tones, i.e. C–1, C#–2, D–3, D#–4, E–5, F–6 and F#–7, as well as the seven pipes for the same notes in the next higher octave. This predetermined wiring of control switch 106 is made up as in the two contact series 160 and 161 and preferably in descending order:

| Contact | Series 160 | Series 161 |
| --- | --- | --- |
| 1 | F#–7 | F#–19 |
| 2 | F–6 | F–18 |
| 3 | E–5 | E–17 |
| 4 | D#–4 | D#–16 |
| 5 | D–3 | D–15 |
| 6 | C#–2 | C#–14 |
| 7 | C–1 | C–13 |

The electric sounding circuits through the contact series of selector control switch 106 are completed by rotary contacts 162 and 163 carried by rotor shaft 164 and lines 165 and 166 respectively to circuit control switches 122 and 123 which as herein shown are in circuit with lead 62.

Selector switches 107 and 108, on the other hand, are of the four-gang variety and include fixed contact series 170, 171, 172 and 173 and 190, 191, 192 and 193 respectively. For reasons to be hereinafter more fully described, the tuning carried out by selector control switch 107 proceeds in ascending order while that of the control switch 108 is in the descending order; however, the series contacts of both switches are predeterminedly arranged to selectively sound the pipe of one note, the same note one octave higher or lower, and selected notes in contrast thereto.

While the contactor series 170 and 171 of selector control switch 107 are arranged to establish circuits to the same note in two octaves and the series 172 and 173 are described as "contrasting" notes, the notes selected for such contrasting tones can be those associated with musically determined "fourth" or "fifth" interval notes or in accordance with other notes selected when wiring of the servicing apparatus is being installed. Therefore, the contacts of series 172 and 173 can be arranged to establish sounding circuits in sequences of musically harmonious tone by which the servicer can compare the tone of the selected pipe simultaneously according to the position of the rotary contacts 175, 176, 177 and 178.

Figure 9:
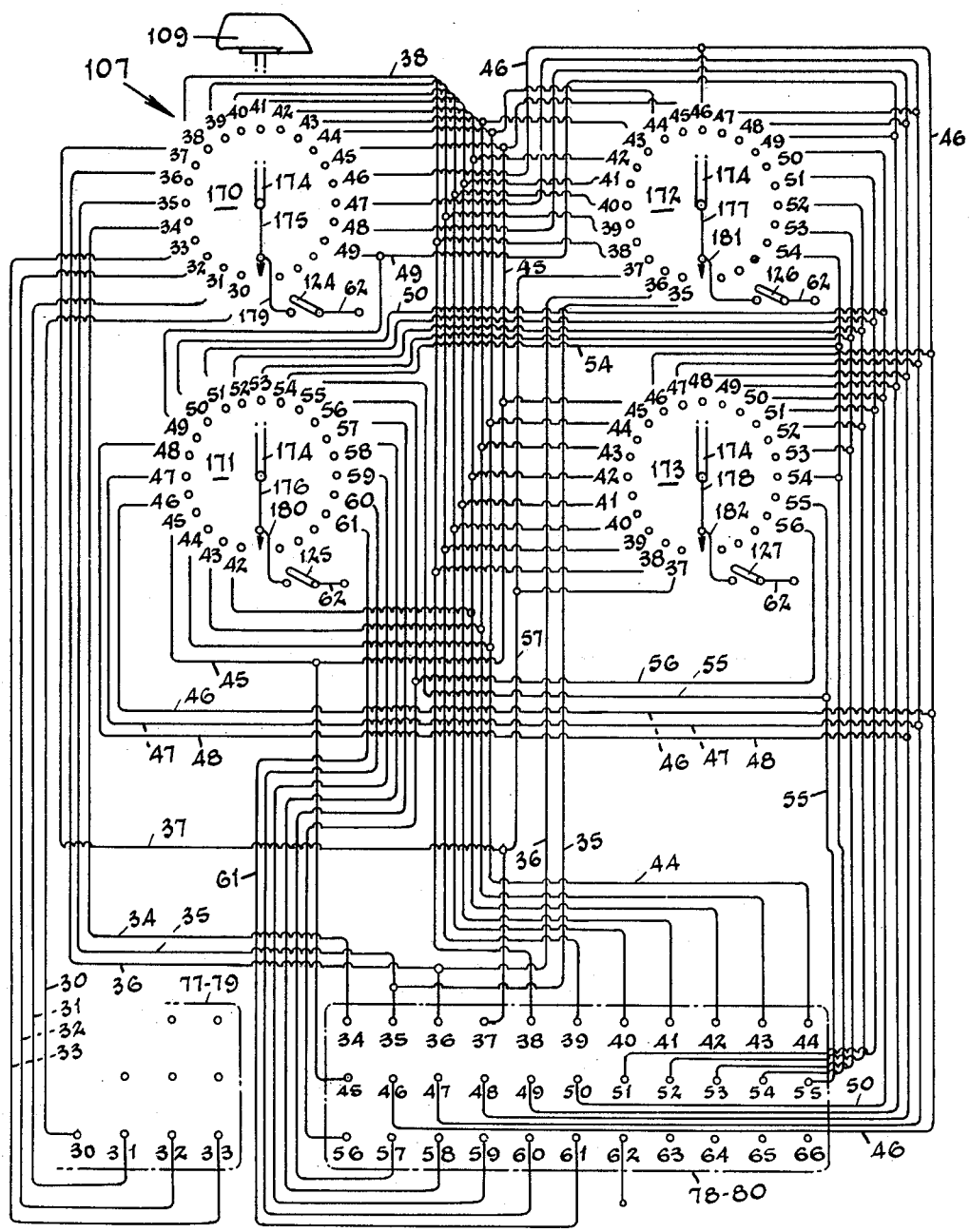
FIG. 9 is a diagrammatic view of the circuit of a third pipe selector control switch.

As shown in FIG. 9, selector control switch 107 is provided with a rotor shaft 174 carrying contacts 175, 176, 177 and 178. Contact 175 is connected to circuit control switch 124 by line 179; contact 176 to switch 125 by line 180; contact 177 to switch 126 by line 181 and, lastly, contact 178 to the circuit control switch 127 by line 182.

In the use of the selector control switch 107, the rotor shaft is turned to the first position of dial 112 whereupon rotary contacts 175, 176, 177 and 178 will be engaged in respective order with the fixed contact 30 of series 170; contact 42 of series 171; contact 35 of series 172 and contact 37 of series 173. Now, upon closure of circuit control switch 124, a circuit will be completed by line 179 from lead 62 through contacts 175 and 30, line 30 to connector 30 of terminal blocks 77 and 79 and through cable 73 to the related organ circuit thereby sounding the organ pipe associated with F–30. The pipe for this particular note was initially sounded during the "playing" of a tempered scale, as described in connection with selector control switch 105, and therefore should again produce the sounding of an F note having a "true" tone. Circuit control switch 125 similarly completes a circuit through lines 62 and 180, contacts 42 and 176, line 42 and connector 42 of terminal blocks 78 and 80 to effect the sounding of the pipe associated with note F–42. Upon opening switch 124 and sequential closure of switches 126 and 127, comparative contrasting notes can be sounded against the F–42, or as herein illustrated, notes A#–35 or C–37.

The servicer can thus correct the tone of pipe F–42 and then, by comparing the tone of F–42 as against F–30, determine if the pitch of F in the two octaves is harmonious. This is explainable by the peculiar pulsations of the two sounds; such pulsations being commonly defined as "beats." To those experienced in the art of servicing a pipe organ, such pulsations or "beats" in combination produce a louder sound than either note produces alone. One noticeable result of the combination of two sounding notes may be a "discord" in which event further corrective toning is required until the "beat" indicates that the tones are harmonious and correct. In ascending order as at the second position of contact series 170, 171, 172 and 173, as indicated by the legends of dial 112, the comparative sounding of F#–31, F#–43, B–36 and C#–38 can be produced. This continues through the positions of the fixed contacts of selector control switch 107 until the sounding of C–49, C–61, E–53 and G–56 at the last active position of the fixed contact series 170–173 is reached. In each instance, this is accomplished by closing and opening of the circuit control switches 124–127.

Figure 10:
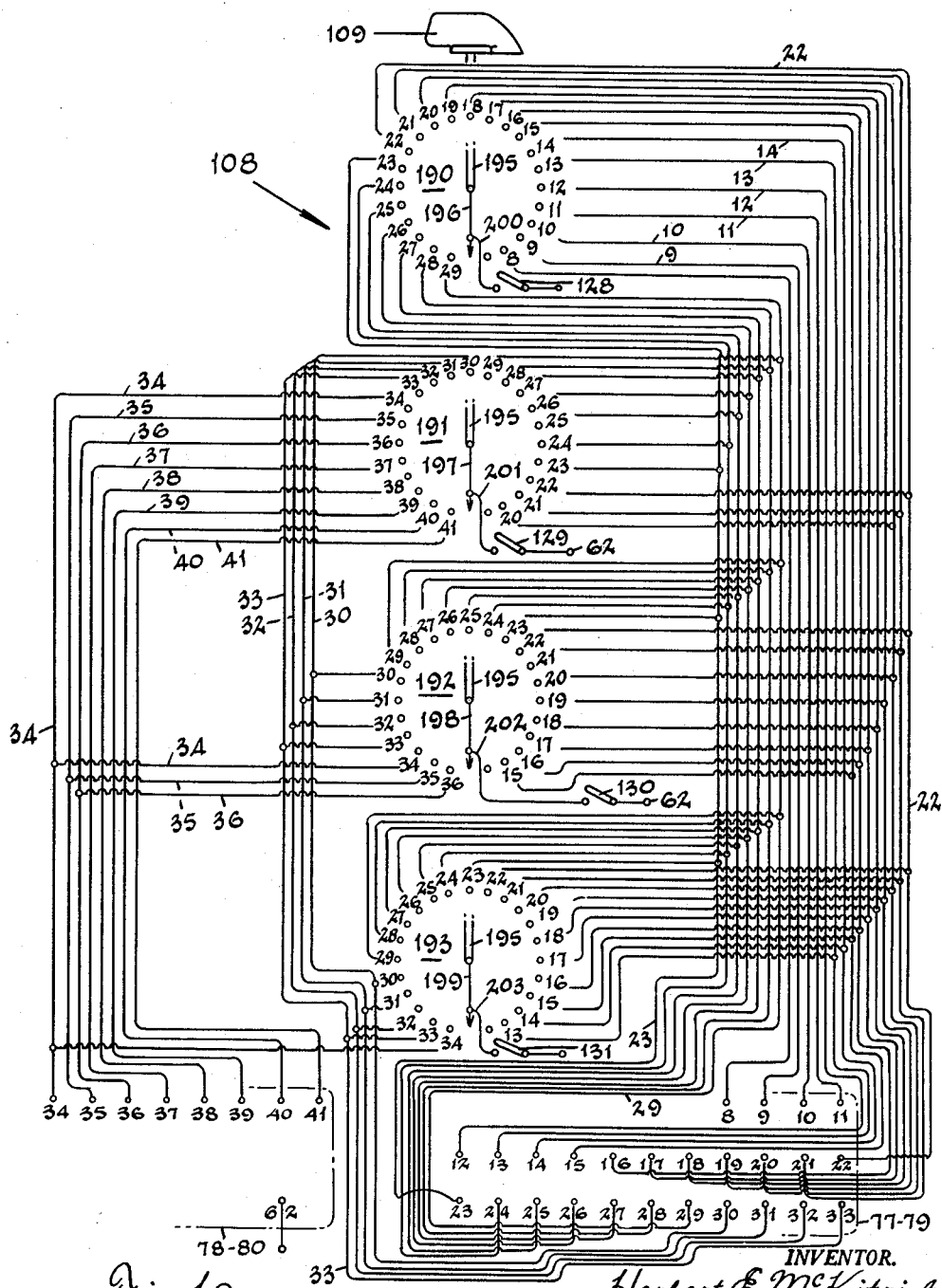
FIG. 10 is a diagrammatic view of the circuit of a fourth pipe selector control switch.

As shown in FIG. 10, the pipe selector control switch 108, having the four fixed contact series 190, 191, 192 and 193, is provided with a rotor shaft 195 on which rotary contacts 196, 197, 198 and 199 are carried. Rotary contact 196 is connected to source line 62 through circuit control switch 128 by line 200; contact 197 through switch 129 by line 201; contact 198 to line 62 through switch 130 by line 202 and rotary contact 199 similarly to line 62 through switch 131 by line 203.

Turning of shaft 195 until the contacts 196–199 are at the first position as indicated by registration of knob 109 with the first legend of dial 113, will engage the said contacts with the first fixed contacts of the series 190, 191, 192 and 193. This will set up circuits to sound the respective pipes for E–29, E–41, B–36 and A–34. Here again, it will be understood that each of these notes were employed in the playing of the tempered scale and in relation to selected other notes such as E–29 against B–24 or A–22 or E–41 against B–36 or A–34. However, due to the established circuitry of selector control switch 105 and the associated shift switches 132 to 144, it was not then possible to produce the sounding of these notes in tuning E–41 note, individually or in contrast to B–36 or A–34, while sounding E–29. Accordingly, the arrangement of the series contacts of selector control switch 108 makes it possible for the servicer to continue his work in the same manner that he or an assistant would if seated at the console. It is believed apparent the same relation of notes by octave or contrast combinations will proceed downwardly until at the last active position of dial 113, the pipes associated with the notes G–8, G–20, D–15 and C–13 can be sounded.

This completes the sounding of each note in a sixty-one note range with the pipe of each of said notes being selectively sounded one or more times according to the selector control switch employed by the servicer. Thus, the control switch 105 is adapted to initially "run" through the notes of a tempered scale; the switch 106 to compare the octave notes descending from F♯–19 to C–1; the switch 107 to sound the pipes for notes F–30 to C–61 individually or in selective contrast in ascending relation and the switch 108 to sound the pipes for notes E–41 to G–8 in the same manner but in descending order. And, while for purposes of illustration, I have selected a tempered scale based on an A–22 or A–34 of 440 pitch and established the circuits of selector control switch 105 for this purpose, I am also aware that, by accustomed practice, others may desire to initially base the notes of a tempered scale on some other characteristic note on which they have predicated their servicing work. It is therefore within the scope of this invention to establish the note combinations of any of the pipe selector control switches 105 to 108 inclusive according to the preference of the servicer so that the circuits completed through the servicing apparatus 76 as herein above described may be said to be those of a typical arrangement but not entirely the selected circuits that can be made up when the wiring of the apparatus is contemplated.

Since a servicing apparatus as described above should be adapted to service more than one organ unit at a time, a unit is herein provided to enable the servicing work to be carried on while the pipes of at least two organ units are sounded simultaneously. Such a duplex or mixer unit, generally indicated by numeral 210 in FIGS. 4 and 11, employs a portable cable 73 from the servicing apparatus 76 and, for example, a cable 73a from the unit 210 to the Swell organ unit and a similar cable 73b from the unit to the Great organ unit. Thus, the terminal blocks 74 and 75 are connected to the fixed terminal blocks 211 and 212 respectively of the duplex unit, while the blocks 77a and 78a of cable 73a are connected on the other side of the unit 210 to the terminal blocks 213 and 214 thereof, and blocks 77b and 78b of cable 73b are connected to unit blocks 215 and 216. This will connect blocks 74a and 75a to the block 70 of the junction box SJ at the Swell organ and blocks 74b and 75b to the block 71 of the junction box GJ at the Great organ.

Figure 11:
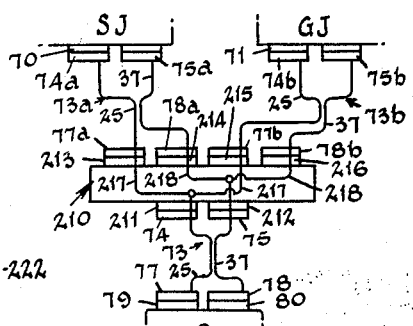
FIG. 11 is a diagrammatic view of a circuit connection employed in FIG. 4.

As shown in FIG. 11, two representative line or sounding circuits are shown connected through the duplex unit 210, such as C–25 through terminal blocks 77–79 and C–37 through blocks 78 and 80. Thus, C–25 will be completed through common line 217 in duplex unit 210 and through blocks 77a—74a by way of cable 73a to the Swell organ unit and blocks 77b—74b of cable 73b simultaneously to the Great organ unit. Likewise, the pipes of C–37 in the Swell and Great organ units will be connected by line 218 through blocks 79a—75a of cable 73a and blocks 77b—75b of cable 73b.

Since the common line 217 is attached at block 211 to the block 74 of cable 73 and line 218 at block 212 to the block 75 of the portable cable, it is believed understandable that upon completion of any of the above-described circuits through selector control switches 105 to 108 inclusive, the desired pipes will be sounded in each of the organ units to which the duplex unit 210 is connected by cables 73a and 73b. This is of course also true in the servicing of the pipe organ such as the combination sounding of the pipes of the two organ units through a tempered scale by use of the selector control switch 105 or the contrast tuning as produced during use of the switches 106, 107 and 108. This is principally due to the fact that one or both of the organ units will possess one or more stops by which the quality of pipe sounding can be monitored to better effect.

Figure 5:
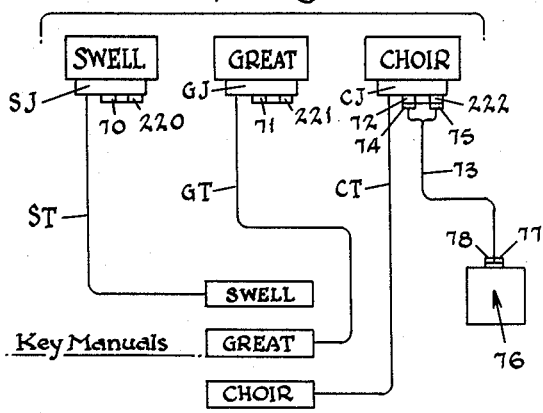
FIG. 5 is a diagrammatic view of the servicing apparatus connected to one unit of a pipe organ having an increased number of pipes from that of FIG. 3.
Figure 12:
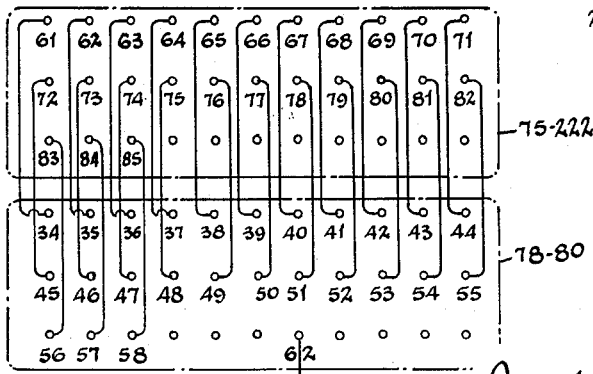
FIG. 12 is a diagrammatic view of a circuit connection employed in FIG. 5.

As earlier explained, use of the servicing apparatus of this invention is not entirely restricted to pipe organs having a playing range of sixty-one notes or less and in the event that pipe organs having a greater included number of pipes are to be serviced, preparatory installation of additional terminal blocks is made at the organ units. According to this novel aspect of the invention as illustrated in FIG. 5, an initial amount of service work is done while the cable blocks 74 and 75 are attached, as described above in connection with FIG. 3, to the junction box of the organ unit to be inspected. This will enable the sounding of at least sixty-one pipes, as was described above, and then, upon connection of the cable block 75 to an additional terminal block, permit continuance of the service work through several ascending octaves. Thus, as shown in FIGS. 5 and 12, the junction boxes of the organ units are each equipped with additional terminal blocks 220, 221 or 222 which will include circuit connectors to the organ circuits for actuating pipes associated with notes C–61 to C–85 inclusive; this being two full octaves, in the musical scale, above the five octaves heretofore discussed. Now, having completed any service work on any of the pipes of an organ unit, or having satisfactorily tuned the organ unit through a range of sixty-one notes, the terminal block 75 of cable 73 is removed from the multiple terminal block of the organ unit being serviced and plugged into the respective additional terminal block. As indicated in FIG. 5, the block 75 has been inserted into the block 222 so that while block 74 is still attached to block 72 of the Choir organ unit, the circuits from terminal blocks 79 and 80 will be actively disconnected from use with the connectors associated with A–34 through C–61. However, as shown in FIG. 12, due to the new installation of block 75 to block 222, connector 34 of blocks 79—80 will connect to C–61 and, in ascending order, continue through to C–85. Since the 34th note is not sounded, in particular selector control switch 107, until the fifth position of series 170 thereof is reached, upon turning of the shaft 174 to this position on dial 112 the servicing of the additional pipes can be carried out. Accordingly, at this position, the pipe associated with C–61 will be sounded upon closure of circuit control switch 124, the pipe of C–73 sounded upon closure of switch 125. Contrasting tones of F–66 and G–68 will be sounded during closure of circuit control switches 126 and 127.

While it is to be appreciated that all of the tuning carried out during normal use of the switch 107 cannot be made by attachment of the block 75 with the block 222, the following table shows the possible octave and the contrast combinations that can be produced:

| Dial Position | Normal Note | Series Contacts ||||
|---|---|---|---|---|---|
| | | 170 | 171 | 172 | 173 |
| 5 | 34 | C-61 | C-73 | F-66 | G-68 |
| 6 | 35 | C#62 | C#74 | F#67 | G#69 |
| 7 | 36 | D-63 | D-75 | G-68 | A-70 |
| 8 | 37 | D#64 | D#76 | G#69 | A#71 |
| 9 | 38 | E-65 | E-77 | A-70 | B-72 |
| 10 | 39 | F-66 | F-78 | A#71 | C-73 |
| 11 | 40 | F#67 | F#79 | B-72 | C#74 |
| 12 | 41 | G-68 | G-80 | C-73 | D-75 |
| 13 | 42 | G#69 | G#81 | C#74 | D#76 |
| 14 | 43 | A-70 | A-82 | D-75 | E-77 |
| 15 | 44 | A#71 | A#83 | D#76 | F-78 |
| 16 | 45 | B-72 | B-84 | E-77 | F#79 |
| 17 | 46 | C-73 | C-85 | F-78 | G-80 |

Briefly reviewing the novel features and operation of the organ servicing apparatus of my invention, it is of primary interest that the tuning of all of the pipes of an organ unit is accurately carried out in accordance with predetermined arrangements of each note in relation to other notes. As well, in each selected arrangement of one note to one or more other notes, the sounding circuits are maintained in this relation during the tuning of a pipe or the sounding of contrasting pipes thereagainst. A further feature of the invention resides in the fact that permanent installation of multiple terminal blocks 70, 71 and 72 is made initially to the units of the pipe organ. Once this is completed, connection of the servicing apparatus 76 to any organ unit is made in the same simple manner as that employed in re-establishing the circuits to a portable telephone instrument at one outlet jack or another. If the location of faulty pipes is previously known or is determined upon playing of the pipe organ in the usual manner at the console thereof, the servicer can then "plug" into the organ circuits of the necessary organ unit and immediately start his work. This may include the running of a tempered scale from one recognized "pitch" note, such as an A-440, by means of the selector control switch 105 and circuit control switches 120 and 121. Having sounded the pipes associated with the notes of the tempered scale in one octave, the sounding can be carried upwardly, or downwardly, through an adjoining octave through switches 132–144 inclusive. If the contrast tones thus produced prove satisfactory, the pipe selector control switches 106, 107 and 108 are employed to sound the notes of the first two octaves through switch 106 and selectively by switches 122 and 123. Then the same selected note in two predetermined octaves, contrasting notes thereagainst can be sounded in ascending order with switch 107 and switches 124, 125, 126 and 127 or in descending order through key control switch 108 and switches 128, 129, 130 and 131 associated therewith.

Figure 4:
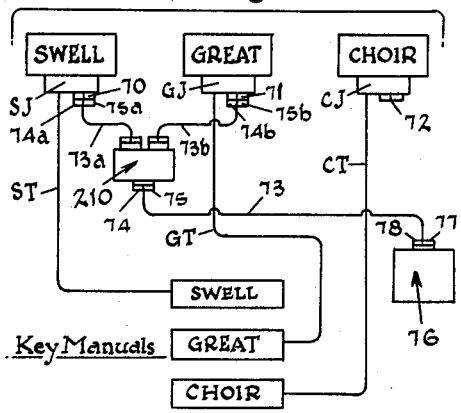
FIG. 4 is a diagrammatic view of the servicing apparatus connected to two units of the pipe organ.

It is further possible for the simultaneous sounding of the pipes of two organ units when it is so desired. One reason for connecting the servicing apparatus 76 to two units of the pipe organ through the duplex unit 210, as shown in FIGS. 4 and 11, is to enable the serviceman to selectively employ the stops of either of the organ units to obtain a better quality or resonance of the tones produced. This particular use of the servicing apparatus therefore affords a materially wider range of servicing work.

The servicing apparatus 76, while constructed for service work with a pipe organ of a certain playing range, such as sixty-one notes, is also useable to service an organ having a greater range. For this purpose, each organ unit is initially provided with an additional terminal block (220, 221 and 222) to which the organ circuits for the pipes of the next higher octaves are connected. By moving the block 75 of the portable cable 73 to any of these blocks, the servicer can continue his work in the same manner and with no more difficulty than was encountered in the tuning of the sixty-one pipes.

It is to be understood that the form of the invention herewith shown and described is to be taken as a preferred embodiment of the same, and that various changes in the shape, size and arrangement of parts may be resorted to without departing from the spirit of the invention.

I claim:

1. A servicing apparatus for tuning a standard pipe organ having a plurality of electric sounding circuits, comprising a portable case, a terminal block mounted on said case having a plurality of circuit connectors substantially equal in number to the sounding circuits of the pipe organ, means carried by the case for removably connecting each of the plurality of circuit connectors in said terminal block to one of said sounding circuits, a plurality of multiple gang switches contained within the portable case having manually operable rotary contacts connected to an electric source through said terminal block, each of the multiple gang switches having at least two series of fixed contacts sequentially engaged by a rotary contact upon rotation thereof and connected in selectively predetermined order to at least two sounding circuits, and normally open switch means also carried by the portable case and connected in said electric source to each of said rotary contacts.

2. A servicing apparatus as claimed in claim 1, including an electric junction box for the pipe organ having terminals connected to the electric sounding circuits thereof, and in which the connecting means carried by the case is a flexible multiple circuit cable having a terminal block attachable to said junction box to connect the circuits originating at each of the fixed contacts of the multiple gang switches into the electrical sounding circuits of said organ.

3. A servicing apparatus as claimed in claim 1, including means for connecting the first contact of one series of fixed contacts of one of said multiple gang switches and the last contact of a second series of fixed contacts of the same switch to a selected sounding circuit within a range of notes in one musical octave, means for connecting the remaining fixed contacts of the said first series sequentially in pairs to another selected sounding circuit in said octave, means for connecting the fixed contacts of the said second series sequentially in pairs to a further selected sounding circuit in said octave, the rotary contacts being adapted to progressively engage the alternately paired contacts of the first and second series of fixed contacts to establish electric circuits sequentially to each of the alternately selected sounding circuits, and switch means in the circuit of each pair of fixed contacts to connect the same to the sounding circuits of the same note within the range of a second octave.

4. A servicing apparatus as claimed in claim 3, in which said last named switch means includes a plurality of selector switches each comprising a switching contact and a related pair of fixed contacts, each switching contact being connected in the circuit of at least one pair of contacts of the said two series of fixed contacts, the first related fixed contact of each selector switch being connected to a selected circuit connector of the terminal block to establish a circuit to the sounding circuit of a selected musical note, the second related fixed contact of each selector switch being connected to a second preselected circuit connector of said terminal block to establish a circuit to the sounding circuit of the same musical note of one octave higher, and means for simultaneously shifting the plurality of switching contacts alternately between the plurality of first related fixed contacts and the plurality of second related fixed contacts to sound the pipes of the musical notes in the range of one octave and then the pipes of the same musical notes in the next higher or lower octave.

5. A servicing apparatus as claimed in claim 1, in which one of said multiple gang switch includes four series of circularly arranged fixed contacts and four rotary contacts each connected to an electric source, means for connecting the fixed contacts of the first series to selected sounding circuits of notes arranged in musically ascending order in a predetermined range of octaves, means for connecting the fixed contacts of the second series to selected sounding circuits of the same musical notes arranged in a contrast range of a higher octave, means for connecting the fixed contacts of the third series to the selected sounding circuit of a predetermined note in musical contrast to each of the notes of the sounding circuits completed through the fixed contacts of the first series, means for connecting the fixed contacts of the fourth series to the selected sounding circuit of a second predetermined note in musical contrast to each of the notes of the sounding circuits completed through the fixed contacts of the said first series and wherein certain of the contacts of the four series of fixed contacts are connected to the same connector of the terminal block to establish a circuit to the sounding circuit of the related organ pipe in preselected order and thus effect sounding of the note of said related organ pipe as the note to be tuned, the same note one octave higher and as a contrasting note against the preselected note to be tuned.

6. A servicing apparatus as claimed in claim 1, in which one of said multiple gang switch includes four series of circularly arranged fixed contacts and four rotary contacts each connected to an electric source, means for connecting the fixed contacts of the first series to selected sounding circuits of notes arranged in musically descending order in a predetermined range of octaves, means for connecting the fixed contacts of the second series to selected sounding circuits of the same musical notes in a contrast range of a higher octave, means for connecting the fixed contacts of the third series to the selected sounding circuit of a predetermined note in musical contrast to each of the notes of the sounding circuits completed through the fixed contacts of the first series, means for connecting the fixed contacts of the fourth series to the selected sounding circuit of a second predetermined note in musical contrast to each of the notes of the sounding circuits completed through the fixed contacts of said first series and wherein certain of the contacts of the four series of fixed contacts are connected to the same connector of the terminal block to establish a circuit to the sounding circuit of the related organ pipe in preselected order as the note to be tuned, the same note one octave higher and as a contrasting note against the preselected note to be tuned.

References Cited in the file of this patent
UNITED STATES PATENTS

| | | |
|---|---|---|
| 2,484,930 | Cornelius | Oct. 18, 1949 |
| 2,649,513 | Luhn | Aug. 18, 1953 |